July 28, 1959  C. M. MENA  2,896,663
CHECK VALVE WITH VALVE SEAT OF RESILIENT MATERIAL
Filed Feb. 28, 1955
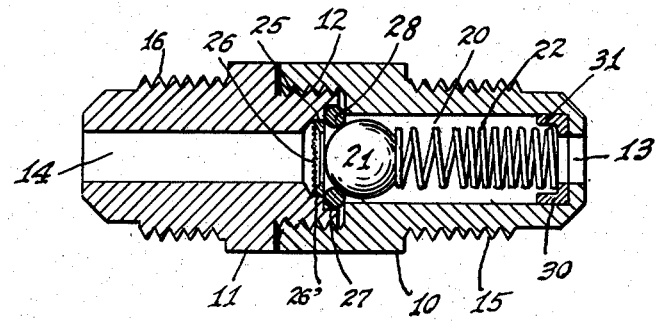
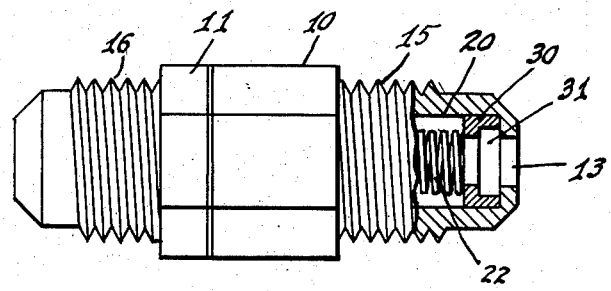
INVENTOR.
CARL M. MENA,
BY
ATTORNEYS.

United States Patent Office 2,896,663
Patented July 28, 1959

2,896,663

CHECK VALVE WITH VALVE SEAT OF RESILIENT MATERIAL

Carl M. Mena, Indianapolis, Ind.

Application February 28, 1955, Serial No. 490,756

3 Claims. (Cl. 137—539)

This invention relates to check valves and has for its object to provide an improved check valve of economical construction. Another object of the invention is to provide a simple and economical check valve with means for varying the spring pressure applied to the valve member so as to vary the fluid pressure required to open the valve.

In carrying out the invention in its preferred form, I employ a valve casing formed of first and second screw-threadedly connected members having aligned axial passages. The axial passage in the first member is deeply counterbored to receive the valve member and a seating spring which reacts against the base of the counterbore. The second member has a relatively shallow two-step counterbore, the smaller-diameter portion of which receives a screen and the larger-diameter portion of which receives an O-ring seal against which the valve member is seated by the aforesaid spring. Desirably, the spring is not of uniform stiffness throughout its length but includes a relatively stiff long-pitch portion and a relatively flexible short-pitch portion. An annular spacing collar, counterbored to a diameter sufficient to receive the adjacent end of the spring, may be interposed in either of two positions between the spring and the base of the counterbore in the first casing-part. With said collar arranged in such a position that its counterbored end receives the spring, the pressure which the spring exerts on the valve member will be greater than if the collar is not used; and if the collar is inverted a still further increase in spring pressure is obtainable.

In the accompanying drawings, which illustrate one form of the invention:

Fig. 1 is a longitudinal section through the check valve with the spacing collar disposed to effect a first increase in spring pressure; and Fig. 2 is a fragmental section similar to Fig. 1 illustrating the spacing collar in inverted position to effect a second increase in spring pressure.

The preferred valve illustrated in the drawing embodies a casing comprising two members 10 and 11 adapted for screw-threaded connection as indicated at 12. The members 10 and 11 are provided respectively with aligned passages 13 and 14 and with exterior screw threads 15 and 16 adapting them for connection to the conduits through which flows the fluid that is to be controlled by the valve.

The member 10 is counterbored deeply, as indicated at 20, for the reception of a valve member 21, preferably a metal-ball, and a compression spring 22 which reacts against the base of the counterbore 20 and which urges the valve member 21 outwardly. The casing member 11 is provided with a two-step counterbore, the smaller-diameter portion 25 of which receives a screen 26 and a screen-retaining collar 26' and the larger-diameter portion 27 of which receives an O-ring seal 28 of rubber or other suitable material. The O-ring 28 provides a seat for the valve member 21 and seals against the circumferential and end walls of the counterbore portion 27.

The screen 26 may be a disk of wire cloth of appropriate mesh. The outer diameter of the collar 26' is desirably larger than the inner diameter of the O-ring 28 so that the O-ring will retain the collar and screen in the counterbore portion 25.

For the purpose of adapting the valve to operate under different pressures, the spring 22 is wound in two portions, one a relatively stiff, relatively long-pitch portion and the other a relatively flexible, short-pitch portion. At least the short-pitch portion of the spring is desirably tapered, as indicated, to maintain a substantially constant rate of deflection. An annular spacing collar 30 is provided for insertion between the spring and the base of the counterbore 20. The spring 22 has a diameter substantially less than that of the counterbore 20. The spacing collar 30 has a diameter substantially equal to that of the counterbore 20 and is counterbored from one face as indicated at 21 to permit it to receive the spring 22.

In the arrangement illustrated in Fig. 2, the collar 30 is disposed with its counterbore 31 opening away from the spring 22 so that the spring seats against the end face of the collar and is compressed thereby to a substantial extent to increase the pressure it exerts on the valve member 21. If the collar 30 is inverted, as shown in Fig. 1, the spring 22 may enter the counterbore 31, thus permitting its partial extension and reducing the pressure it exerts on the valve member 21. By removing the collar 30 completely, the pressure exerted by the spring on the valve member may be still further reduced.

By employing a spring 22 having portions of different stiffness and by employing the counterbored collar 30, the valve may be adapted for operation under a wide variety of pressures. The O-ring valve seat is durable and provides an effective seal preventing flow through the valve in a reverse direction.

I claim as my invention:

1. A check valve, comprising first and second screw-threadedly interconnected members having aligned passages the adjacent ends of which are counterbored, a screen and an annular screen retainer within the counterbore of the first member, an O-ring seal overlying said retainer and having an internal diameter less than the external diameter of said retainer, a valve member movable axially into and out of engagement with said seal, a helical compression spring in the counterbore of the second member having portions of different flexibility acting on said valve member to urge it to seating engagement on said O-ring, and an annular spacer interposed between said spring and the base of the counterbore in the second member, said spacer being counterbored at one end to a diameter great enough to receive the adjacent end of the spring and being insertable into the counterbore of the second member alternatively with its own counterbore presented toward or away from the spring.

2. A check valve, comprising first and second screw-threadedly interconnected members having aligned passages the adjacent ends of which are counterbored, a screen and an annular screen retainer within the counterbore of the first member, an O-ring seal overlying said retainer and having an internal diameter less than the external diameter of said retainer, a valve member movable axially into and out of engagement with said seal, a helical compression spring in the counterbore of the second member acting on said valve member to urge it to seating engagement on said O-ring, and an annular spacer interposed between said spring and the base of the counterbore in the second member, said spacer being counterbored at one end to a diameter great enough to receive the adjacent end of the spring and being insertable into the counterbore of the second member alternatively with its own counterbore presented toward or away from the spring.

3. A check valve, comprising first and second screw-threadedly interconnected members having aligned passages, the adjacent ends of which are counterbored, a screen and an annular screen retainer within the counterbore of the first member, an O-ring seal overlying said retainer and having an internal diameter less than the external diameter of said retainer, said O-ring seal comprising an annular body of compressible material having a substantially circular shape in cross-section, said seal bearing against the bottoms of the counterbores in said two members and against the side of the counterbore of the first member, a valve member movable axially into and out of engagement with said seal, and a helical compression spring in the counterbore of the second member having portions of different flexibility acting on said valve member to urge it to seating engagement on said O-ring.

References Cited in the file of this patent

UNITED STATES PATENTS

| | | |
|---|---|---|
| 1,286,397 | Olsen | Dec. 3, 1918 |
| 1,554,127 | Roberts | Sept. 15, 1925 |
| 1,742,755 | Cataline | Jan. 7, 1930 |
| 2,065,087 | May | Dec. 22, 1936 |
| 2,322,139 | Kaelin | June 15, 1943 |
| 2,331,393 | Hall | Oct. 12, 1943 |
| 2,400,817 | Fox | May 21, 1946 |

FOREIGN PATENTS

| | | |
|---|---|---|
| 278,182 | Great Britain | Oct. 6, 1927 |
| 888,686 | France | Sept. 13, 1943 |